UNITED STATES PATENT OFFICE.

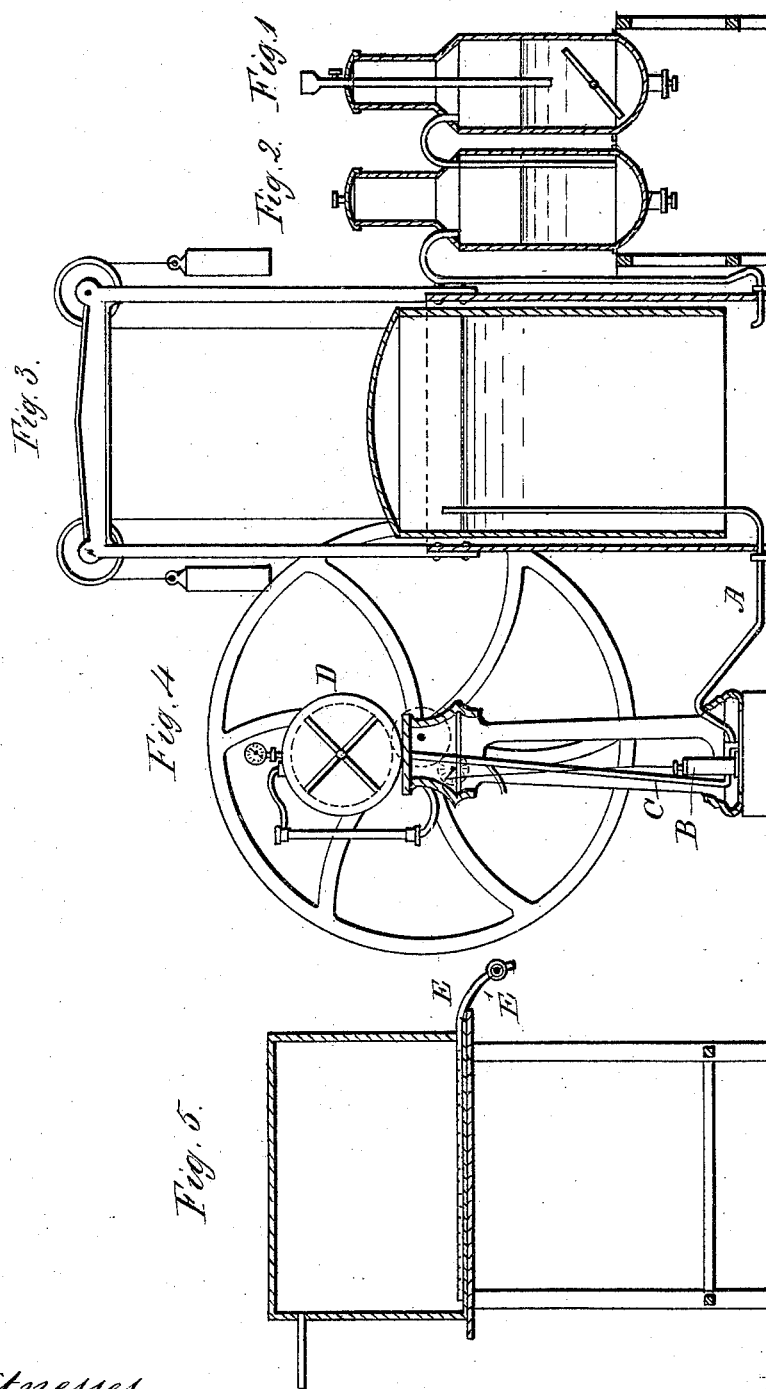

GEORGES FLEURY, OF RENNES, FRANCE.

APPARATUS FOR PURIFYING ALCOHOLIC LIQUORS.

SPECIFICATION forming part of Letters Patent No. 286,126, dated October 2, 1883.

Application filed March 9, 1883. (No model.) Patented in France May 5, 1882, No. 148,774, and in England September 30, 1882, No. 4,658.

*To all whom it may concern:*

Be it known that I, GEORGES FLEURY, a citizen of the Republic of France, residing at Rennes, France, have invented new and useful Improvements in Apparatus for Purifying Alcoholic Liquors, (for which I have obtained a patent in France, No 148,774, dated May 5, 1882,) of which the following is a specification.

To use this process in distilleries which produce alcohol from farinaceous substances—beet-root, molasses, and various other substances—no alteration need be made in the existing apparatus; but the following, used in manufacturing aerated waters, must be added.

In the accompanying drawings, Figure 1 is the carbonic-acid gas produced; Fig. 2, the washing apparatus; Fig. 3, the receiver. Fig. 4 is the saturating apparatus; Fig. 5, the evaporating-tank.

The carbonic-acid gas is generated in Fig. 1, washed in Fig. 2, collected in the receiver, Fig. 3, and passes by the pipe A to the force-pump B, Fig. 4, and by the pipe C to the mixing-vessel D. The foregoing apparatus, being that commonly used in the manufacture of aerated waters and well known to persons skilled in the manufacture, needs no further description here. The spirit to be operated upon is also conveyed to the mixing-vessel D, where it is combined and intimately mixed with the carbonic acid under a pressure of from ten to fifteen atmospheres. When this mixing is completely effected, the aerated spirit is led by a suitable pipe, E, by the opening of the valve E', to the evaporating-tank, Fig. 5, in which (preferably upon the bottom) is placed the end of pipe E, perforated as shown, or formed into a rose; but the former plan is preferable, as it allows free escape of the spirit, and also still more finely divides it. The tank, Fig. 5, should be shallow and of large area, and the gas escapes here, carrying with it the fusel-oil, &c., and leaving a thoroughly defecated product, which is then passed to the usual rectifying-still.

I am aware that carbonic-acid gas as a purifying and defecating agent for alcoholic liquors has heretofore been used, and I do not desire to claim such use, broadly.

Having thus described my invention, I claim—

The combination, with the ordinary apparatus for producing carbonic-acid gas and mixing the same with the liquid under pressure, of the evaporating-tank and perforated pipe E, substantially as described and illustrated, whereby the spirit is mixed with carbonic-acid gas, which, when liberated in said evaporating-tank, carries with it the fusel-oils, vapors, and the like.

In witness that I claim the foregoing I have hereunto set my hand, in the presence of two subscribing witnesses, this 2d day of October, in the year of our Lord 1882.

GEORGES FLEURY.

Witnesses:
JULES HANDOINS,
AUGUST JOBERT.